DEVICE FOR PERMANENTLY JOINING OBJECTS

Filed April 18, 1955 3 Sheets-Sheet 1

INVENTOR.
FRED WOHLMAN
BY
Henry Heyman
ATTORNEY

April 10, 1956 F. WOHLMAN 2,741,069

DEVICE FOR PERMANENTLY JOINING OBJECTS

Filed April 18, 1955 3 Sheets-Sheet 2

INVENTOR.
FRED WOHLMAN
BY
Henry Heyman
ATTORNEY

FRED WOHLMAN
INVENTOR.

BY Henry Heyman
ATTORNEY

United States Patent Office
2,741,069
Patented Apr. 10, 1956

2,741,069

DEVICE FOR PERMANENTLY JOINING OBJECTS

Fred Wohlman, Inglewood, Calif., assignor to Hughes Aircraft Company, Culver City, Calif., a corporation of Delaware Application April 18, 1955, Serial No. 501,351

11 Claims. (Cl. 49—1)

The present invention relates generally to a device for permanently joining objects and relates more specifically to an apparatus for use in the manufacture of semiconductor translating devices and for permanently attaching a glass bead or the like to an elongated wire lead. The assembly thus constructed serves thereafter to form one element of a partially assembled semiconductor translating device.

In the manufacture of semiconductor translating devices such as, for example, transistors of various types, diodes or rectifiers, photocell devices and the like, it is important that all of the various components thereof be assembled in a precise manner inasmuch as relatively small parts of such devices must accurately be positioned relative to other parts in order that the resulting electrical value of the ultimate finished product may be maintained at a high degree of accuracy. Additionally, most contemporary semiconductor translating devices employ components that are preferably encased in a hermetically sealed support and surrounding structure, in order that the function thereof may properly be maintained following assembly of the necessarily relatively small components in semiconductor translating devices. Inasmuch as extreme accuracy must always be present, precise positioning and alignment of the various components of the encasing structure must be maintained, and in forming subassemblies of the encasing structure, that are usually of glass, it is important that a time controlled electrically heated fusing cycle be accurately provided.

Heretofore, in similar structures, serious difficulties have been presented relative to accurate and precise positioning and alignment of end closure members for a semiconductor translating device on suitable leads extending from the devices. In order that high production may be maintained, it is important that the rejection rate of improperly constructed subassemblies for semiconductor translating devices be maintained at a low level commensurate with the necessity of handling the extremely small components that go to make up such translating devices. Not only must precise dimensional tolerances be held in permanently attaching a bead to a wire lead as far as the diameter of the bead is concerned and as far as the distance of the bead from one end of the lead is further concerned, but the physical connection between the bead and the lead must also constitute an intimate contact situation in order to provide for the ultimate desired hermetically sealed condition and proper fit and alignment with other components of the semiconductor translating devices. In light of the necessity for manual handling and placement of the relatively small semiconductor translating device components in apparatus for construction subassembly thereof, and in view of the frangible nature of some of these components, consideration must also be given to the accessible nature of machines and subassembly forming apparatus, so as to aid the operator in maintaining as high a production rate as possible. Prior arrangements designed for a similar purpose have been manually difficult to operate and slow in operating characteristics, have failed to consider the requirements of an operator thereof and have, additionally, failed to maintain the necessary and required precise tolerance limits for mass production situations.

Accordingly, the present device contemplates the provision of an apparatus that will serve to first support a wire lead having a glass bead manually positioned thereon, to align and position the bead at a predetermined distance from one end of the lead, effect operation of a heating element over a predetermined period of time, and reset the machine for the next operational cycle thereof.

Accordingly, it is one important object of the present invention to provide a novel device for permanently joining objects with each other.

It is another important object of the present invention to provide a novel device for permanently joining and fusing a glass bead with respect to a wire lead, thus to construct a subassembly of a semiconductor translating device.

It is a further important object of the present invention to provide an apparatus for assembling subassemblies of semiconductor translating devices wherein novel means are employed to effect heating and fusing of a glass bead to a wire lead in accordance with a predetermined timed heating cycle.

Still another important object of the present invention is to provide a device for manufacturing partially assembled semiconductor translating devices, wherein novel means are employed for supporting, aligning and guiding such partially assembled components with suitable heating and glass fusing means in a manner enabling precise construction of these components.

A still further important object of the present invention is to provide a novel device for permanently joining objects, such as glass beads with wire leads, that is relatively simple in construction, has simplified operating characteristics enabling operation by unskilled operators, is reliable in use, effective in operation and which requires very little, if any, continued maintenance.

Other and further important objects of the present invention will become apparent from the disclosures in the following detailed specification, appended claims and accompanying drawings, wherein:

Figure 1:
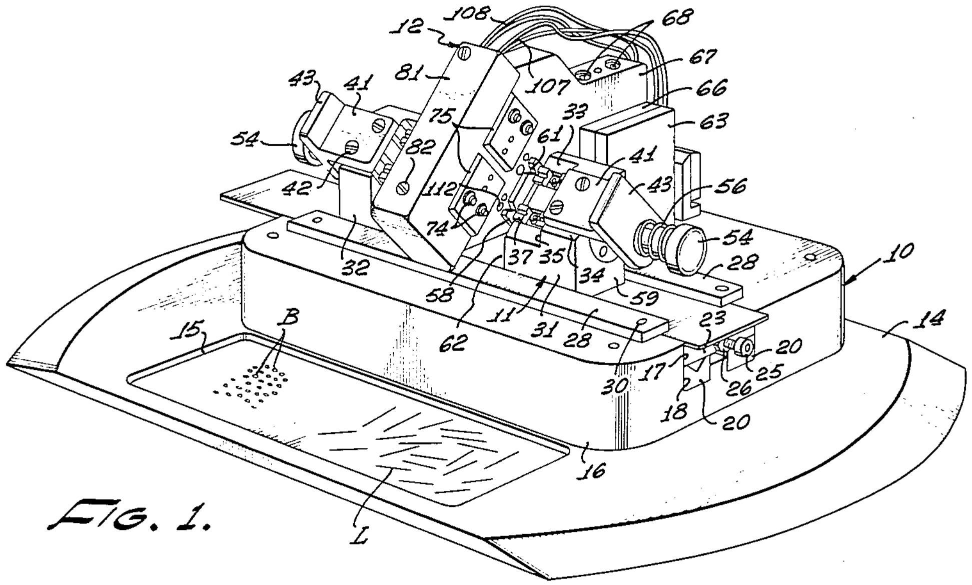
Figure 1 is a perspective view showing the present device for permanently joining one object with another.

With reference to the drawings, the device of the present invention includes generally a base structure 10, a carriage 11, movably mounted on the base structure 10, a head or stationary portion 12 and a timer arrangement indicated generally at 13. As shown in Fig. 1, the base structure 10 is designed preferably to rest upon a supporting tray 14 or the like, that may be made from any suitably resilient or flexible material, for example, and which may contain a recessed tray portion 15 in which components to be assembled by the present device may be placed for ready access by an operator. As shown in Fig. 1, one end of the tray 15 may, for example, receive a plurality of wire leads L while the other end of the tray may contain a quantity of glass beads B.

The base structure 10 includes a base body portion 16 having a generally rectangular transversely extending groove 17 formed therein. The base of the groove 17 is provided with parallel secondary grooves 18 in which a pair of ways 20 are permanently positioned. The ways 20 have upwardly directed V-shaped grooves 21 in which a plurality of ball type rollers 22 are positioned. The lateral ends of the groove 17 are fitted with transversely disposed members 23, Fig. 2, that are secured in position by means of recessed screws 24, for example. The lower surfaces of the members 23 are adapted for engagement with the upper surfaces of the ways 20, thereby to limit travel of the rollers 22 in the grooves 21. The transverse members 23 are provided with coextensive, inwardly directed adjustable stop members in the form of screws 25 that threadably engage the members 23 and extend into the space defined by the groove 17. The stop members 25 are adapted to be locked in position by means of lock nuts 26.

The carriage structure 11 includes a base member 27 that is adapted to be positioned in the groove 17 and to rest upon the ball type rollers 22. The base member 27 is retained within the groove by means of elongated bars 28 that are attached to the base body portion 16 by means of screws 30 and extend over the upper surfaces of both the space defined by the groove 17 and side portions of the carriage base member 27. Lateral ends of the carriage base member 27 are adapted for engagement with the inner ends of the adjustable stop members 25, whereby to limit lateral movement of the carriage.

Figure 5:
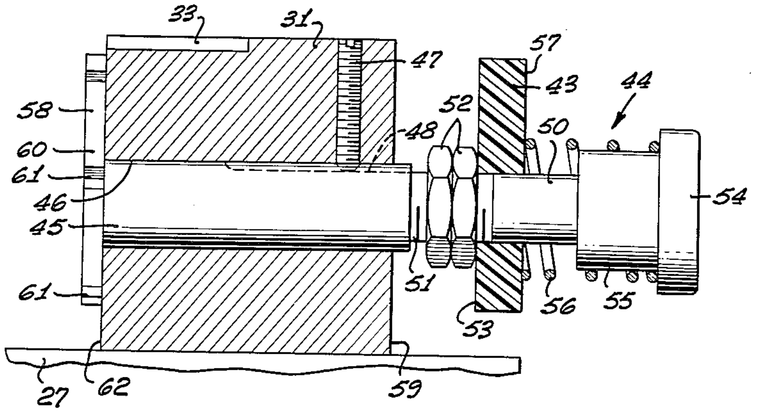
Fig. 5 is an enlarged fragmentary sectional view showing the means for initially positioning the bead on the lead, as taken substantially as indicated by line 5—5, Fig. 2.

The carriage base member 27 has mounted thereon a pair of lead carrying blocks 31 and 32. The blocks 31 and 32 have upwardly and forwardly directed beveled surfaces 33, forming notches in opposing faces of the blocks, and further beveled surfaces 34. Shoulders 35 are defined between the lateral ends of the surfaces 33 and 34. The surfaces 33 are each provided with laterally extending grooves or elongated rectangular recesses 36 in which a plurality of permanent magnets 37 are positioned. Each of the permanent magnets 37 is secured in position by means of a screw 38, with the faces of the permanent magnets 37 being provided with grooves or V-shaped slots 40. A pair of operating handles 41, of insulatory material, are secured on the surfaces 34 on the blocks 31 and 32, by means of screws 42, with each of the handles 41 being provided with hand or finger engageable portions 43 that extend diagonally over outer faces of the blocks 31 and 32. The hand engageable portions 43 each serve to support bead aligning structures indicated generally at 44, Fig. 5. The structures 44 each include a shaft 45 that is slidably journalled in a transverse portion 46 in each of the blocks 31 and 32, and are keyed to prevent rotation of the shaft with respect to the portion 46 by means, for example, of a threaded screw 47, the inner end of which is disposed in a longitudinal groove 48 in the shafts 45. The structures 44 are identical with respect to each of the blocks 31 and 32 and accordingly, only a single one will be defined herein. The outer end of the shaft 45 is reduced in diameter as at 50 and threaded as at 51 for reception of lock nuts 52. The lock nuts 52 are adapted for normal engagement with an inner surface 53 of the handle portion 43. The outer end of the reduced diameter portion 50 is fitted with a button member 54 having a reduced diameter portion 55, there being a compression spring 56 arranged between an outer surface 57 of the handle portion 43 and the button 54 surrounding the reduced diameter portion 55 thereof. Upon manual movement of the button 54 in a direction to compress the spring 56, the nuts 52 will limit axial movement of the shaft 45 by engagement thereof with an outer surface 59 of the block 31. The end of the shaft 45 remote from the reduced diameter portion 50 thereof is fitted with a plate member 58 having a diagonally disposed edge surface 60 in which there is a pair of V-shaped notches 61. Thus, upon depression of the button 54, the plate member 58 will be moved inwardly from its normal position against an inner surface 62 of the block 31, for a purpose to be hereinafter more fully described.

Figure 4:
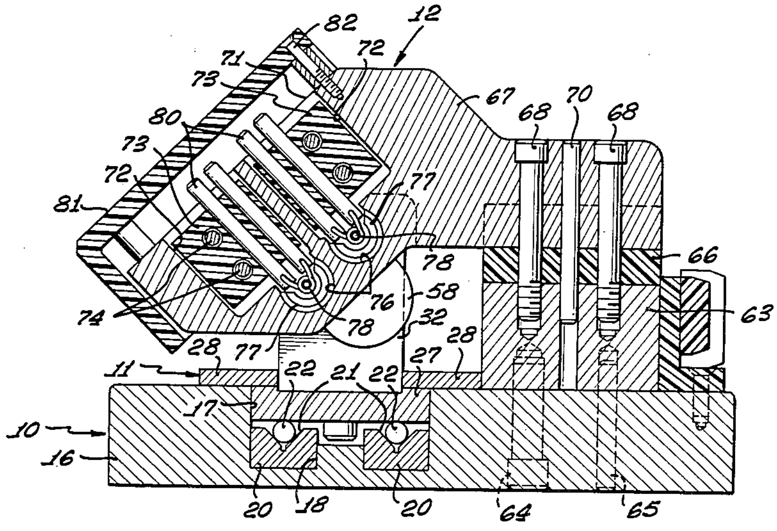
Fig. 4 is a transverse sectional view taken substantially as indicated by line 4—4, Fig. 3.

As shown in Fig. 4, a generally U-shaped bracket 63 is mounted on the base structure body portion 16 and secured thereto by means of screws 64 and a pin 65. The bracket 63 serves to support a further generally U-shaped insulatory member 66 on which the head 12 is mounted. The head 12 includes a body portion 67 that is mounted on the insulatory member 66 by means of screws 68 and a guide pin 70. The head body portion 67 extends from the bracket 63 to a position in an interference path of lateral travel of the carriage 11 and blocks 31 and 32 mounted thereon. The forward portion of the head body portion 67 is provided with an angularly disposed surface 71 in which a pair of generally rectangular open sided recesses 72 are formed. The recesses 72 serve to receive and support a pair of insulating members 73 which are secured therein by means of screws 74 that, in time, extend through plates 75 carried on the outer surface of the body 67 and adapted for engagement with the outer surfaces thereof, whereby adjustably to support the insulating members 73 in the recesses 72. The body portion 67 of the head 12 is further provided with a pair of laterally disposed bores 76 therethrough, in which heat resistant cups 77 of metal encased ceramic or the like are adapted to be positioned. A pair of coiled electrically energizable heating elements 78 are positioned within central openings in the cups 77, with leads therefrom being attached to a plurality of elongated pin shaped connectors 80, carried by the insulating members 73. The connectors 80 are slidably adjustably disposed in the insulating members 73, whereby to permit accurate concentric positioning of the coiled heating elements 78 within the cups 77. The outer exposed ends of the connectors 80 are covered by means of a protective insulating cover member 81 that is secured in spaced relationship, to the outer surface 71 of the head body portion 67, by means of suitable screws 82, or the like. The lower end of the cover member 81 is curved over the lower end of the body 67, while the upper end thereof is open to provide an entrance for electrical leads extending to the connectors 80, as will be hereinafter more fully described.

Figure 2:
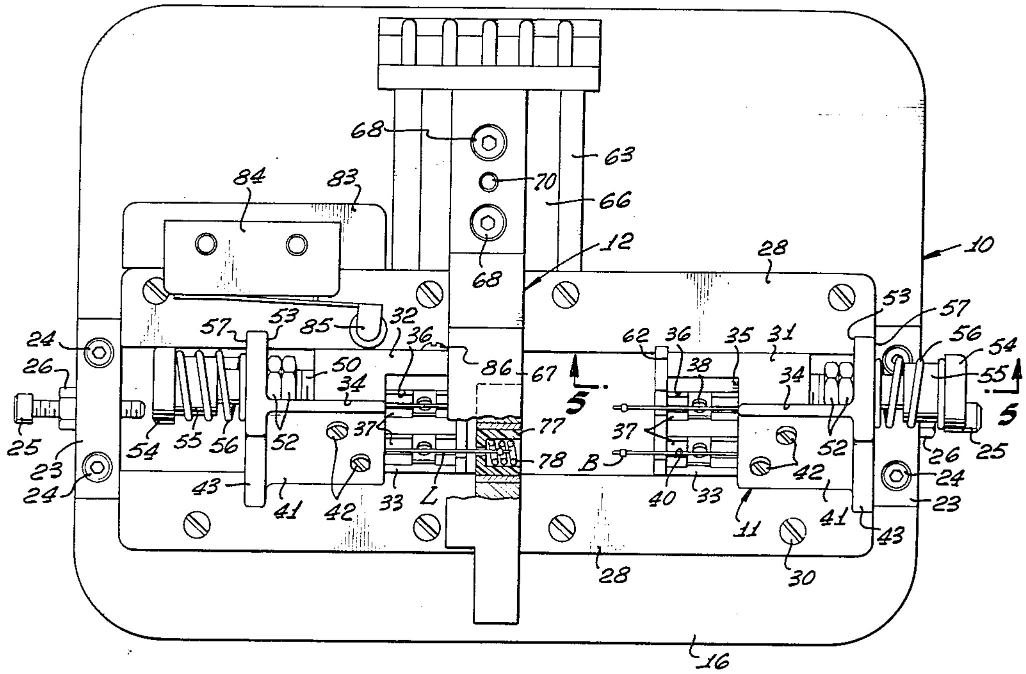
Fig. 2 is a top plan view of the present device.
Figure 3:
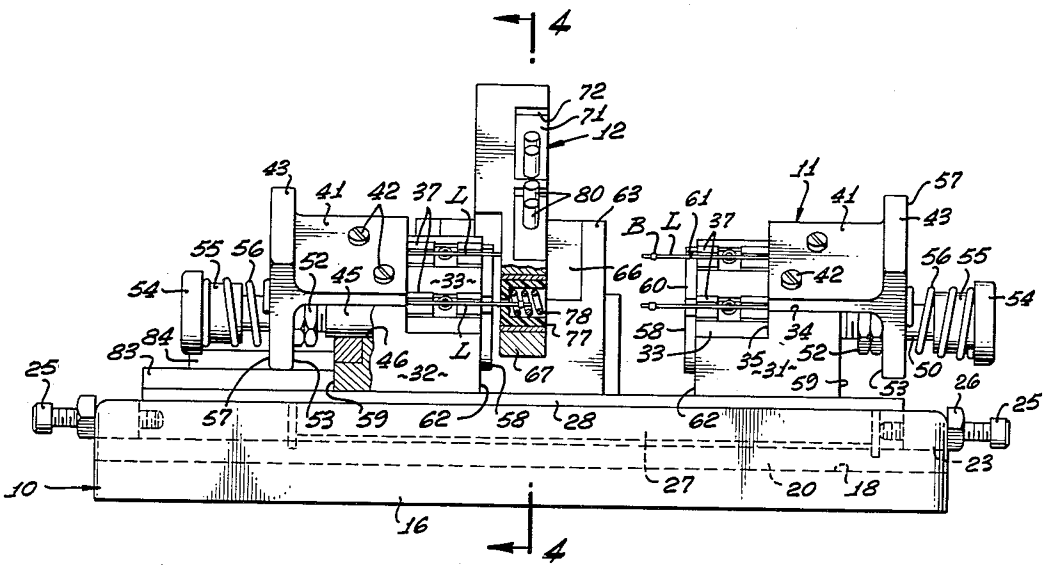
Fig. 3 is a front elevational view of the device with portions thereof being in section.

As shown primarily in Fig. 2, a spacer 83 is mounted on one side of the base body portion 16, there being a normally open switch 84 carried thereby. The switch 84 is disposed over an upper surface of one of the bars 28 and has a roller switch operating structure 85 carried thereby. A protruding screw 86, carried by a rearwardly directed surface of the carriage block 32, is adapted for cooperation with the roller switch operating structure 85 when the carriage 11 is moved in either lateral direction, for a purpose to be hereinafter more fully described.

Figure 6:
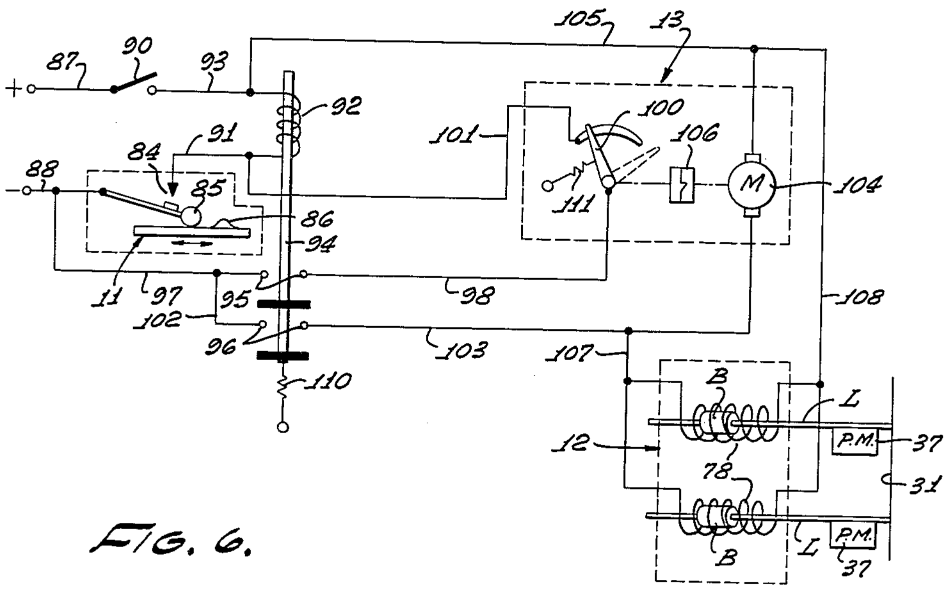
Fig. 6 is a schematic wiring diagram showing a typical electrical system that may be employed with the present joining device.

With reference primarily to Fig. 6, the mechanism described hereinbefore is connected to the suitable timer mechanism 13 in a manner to permit the necessity of only momentary closure of the switch 84 and thereafter provide a timed heating cycle for the coiled heating elements 78. As shown, electrical energy is provided from a source through suitable leads 87 and 88, there being a master switch 90 in the lead 87. The lead 88 connects to one side of the switch 84, there being a lead 91 extending from the other side of the switch 84 to a coil 92 of a relay. The other side of the coil 92 is connected to a lead 93 extending to the master switch 90. Upon momentary closure of the switch 84, by engagement of the screws 86 with the roller switch actuating structure 85, the coil 92 will be energized, whereby to move an armature 94 in a direction to close a pair of contacts 95 and 96. One of the contacts of the contact pair 95 is connected to a lead 97 extending to the input lead 88, with the other of the contacts 95 being connected to a lead 98 which makes contact with a slidable contact structure 100 in the timer mechanism 13. A slidable contact structure, in the timer mechanism, is connected to the other side of the switch 84 by means of a lead 101. Accordingly, the lead 97, contacts 95, leads 98 and 101 and slidable contact structure 100 serve as a holding circuit to maintain energization of the coil 92 following momentary closure of the switch 84. One of the contacts of the contact 96 is connected by means of a lead 102 to the lead 97, the other of the contacts 96 being connected, by means of the lead 103, to a driving motor 104, the other side of the driving motor being connected to the other side of the circuit by means of a lead 105 which interconnects with the lead 93. The motor 104 serves to drive the moveable contact structure 100 by means of a clutch 106, with the motor 104, clutch 106 and moveable contact structure 100 being housed within and forming portions of the timer mechanism 13. Simultaneously with the energization of the motor 104, the coiled heating elements 78 are also energized through leads 107 and 108 that connect respectively with leads 103 and 105. Thus, upon momentary energization of the switch 84, the coil 92 of the relay will be energized, with the circuit being maintained in a closed condition by means of the moveable contact structure 100. The motor 104 will also be energized to drive the moveable portion of the contact structure 100 toward the position indicated by the dotted lines thereof. When the moveable portion contact structure 100 leaves the stationary contact thereof, the holding circuit for the relay coil 92 will be interrupted, whereby to de-energize the coil 92. At this time, a tension spring 110, connected to the armature 94, will serve to open the contacts 95 and 96 and thereby to de-energize the entire circuit. Additionally, a tension spring 111, connected to the moveable portion contact structure 100, will reset the contact to the position shown by the solid lines, preparatory to the next heating and bead fusing cycle.

In operation of the present device, an operator manually places a bead B on one of the leads L and thereafter positions the lead L in one of the grooves 40 of one of the magnets 37. It is to be understood that the leads L are made from highly permeable metallic material. This operation is again repeated with respect to the other magnet carried on either the block 31 or the block 32. The leads L are moved laterally along the grooves 40 in the permanent magnet 37 until the inner ends thereof abut the shoulder 35. The beads B are moved a considerable distance inwardly on the lead L, so as to be in close approximation to the outer face of the plate 58. Thereafter, the button 54 is depressed, thus moving the plate away from the block face 62, with the V-shaped notches 61 surrounding the leads L, whereby to move the beads B to the proper predetermined position from the outer ends of the leads L. The carriage 11 is thereafter manually laterally moved by hand engagement with the handle portions 43, so as to dispose the outer ends of the leads L, together with the beads B disposed thereon, through openings 112 in the head body portion 67 and into the interiors of the coils of the heating elements 78. As described hereinbefore, movement of the carriage 11 in either direction will energize the circuit to initiate action of the timer mechanism 13 and provide energy for electrically heating the elements 78. The leads L and beads B, previously placed upon an opposite carriage block 31 or 32, may thereafter be removed and this now newly exposed carriage block and permanent magnets carried thereby may be fitted with additional leads and beads for the next fusing cycle. It is to be noted that the notches 40, in the permanent magnets 37, provide means for aligning the leads and the beads with the coils 78, and that the lateral end positions of the leads and beads within the coil 78 are determined by engagement of the carriage base 27 with the adjustable stop members 25. Thus, as one pair of beads is being fused upon one pair of leads, another pair may be prepared for fusion on the opposite block 31 or 32, with the timed heating cycle being automatically provided by simple movement of the carriage 11 in a direction to dispose bead carrying outer ends of leads in the coiled heating elements 78.

It may thus be seen that the present device provides novel means for supporting, aligning and fusing glass beads on ends of wire leads at a predetermined distance from such ends of the wire leads. It may also be seen that the device of the present invention is designed for relatively high mass production commensurate with the size of the components being assembled thereby, and that the various components of the device are positioned in such a manner as to be readily accessible by an operator thereof.

Having thus described the invention and the present embodiment thereof, it is desired to emphasize the fact that many modifications may be resorted to in a manner limited only by a just interpretation of the following claims.

I claim:

1. In a device for permanently attaching a tubular member to an elongated member: a base structure; a carriage disposed for lateral reciprocal movement on said base structure; a stationary head mounted on said base structure; heating element means disposed in said head; means operatively associated with said carriage for supporting at least one elongated member having a tubular member slidably disposed thereon; and means carried by said supporting means for permitting manual placement of said tubular member at a predetermined position on said elongated member, said carriage being adapted thereafter for manual reciprocal movement to position at least a portion of said elongated member and said tubular member in heat inducing relationship with said heating element means, whereby to fuse said tubular member to said elongated member.

2. In a device for permanently attaching a tubular member to an elongated member: a base structure; a carriage disposed for lateral reciprocal movement on said base structure; a stationary head mounted on said base structure; coiled heating element means disposed in said head; means operatively associated with said carriage for supporting at least one elongated member having a tubular member slidably disposed thereon; and means carried by said supporting means for permitting manual placement of said tubular member at a predetermined position on said elongated member, and for aligning said elongated member with said heating element means, said carriage being adapted thereafter for manual reciprocal movement to position at least a portion of said elongated member and said tubular member in heat inducing relationship within said heating element means whereby to fuse said tubular member to said elongated member.

3. In a device for permanently attaching a tubular member to an elongated member: a base structure; a carriage disposed for lateral reciprocal movement on said base structure; a stationary head mounted on said base structure; heating element means disposed in said head; means operatively associated with said carriage for supporting at least one elongated member having a tubular member slidably disposed thereon; means carried by said supporting means for permitting manual placement of said tubular member at a predetermined position on said elongated member, said carriage being adapted thereafter for manual reciprocal movement to position at least a portion of said elongated member and said tubular member in heat inducing relationship with said heating element means, whereby to fuse said tubular member to said elongated member; and means responsive to said reciprocal movement of said carriage for energizing said heating element means.

4. In a device for permanently attaching a tubular member to an elongated member: a base structure; a carriage disposed for lateral reciprocal movement on said base structure; a stationary head mounted on said base structure; heating element means disposed in said head; means operatively associated with said carriage for supporting at least one elongated member having a tubular member slidably disposed thereon; means carried by said supporting means for permitting manual placement of said tubular member at a predetermined position on said elongated member, said carriage being adapted thereafter for manual reciprocal movement to position at least a portion of said elongated member and said tubular member in heat inducing relationship with said heating element means, whereby to fuse said tubular member to said elongated member; and means including a timer arrangement and responsive to said reciprocal movement of said carriage for energizing said heating element means for a predetermined period of time.

5. In a device for permanently attaching a tubular member to an elongated member: a base structure; a carriage disposed for lateral reciprocal movement on said base structure; a stationary head mounted on said base structure; coiled heating element means disposed in said head; means operatively associated with said carriage for supporting at least one elongated member having a tubular member slidably disposed thereon; means carried by said supporting means for permitting manual placement of said tubular member at a predetermined position on said elongated member, and for aligning said elongated member with said heating element means, said carriage being adapted thereafter for manual reciprocal movement to position at least a portion of said elongated member and said tubular member in heat inducing relationship within said heating element means, whereby to fuse said tubular member to said elongated member; and means including a timer arrangement and responsive to said reciprocal movement of said carriage for energizing said heating element means for a predetermined period of time.

6. A device for permanently attaching glass beads to elongated wire members comprising, in combination: a base structure; a carriage; roller means for supporting said carriage for lateral reciprocal movement on said base structure; a plurality of heating elements; a supporting structure for said heating elements, said supporting structure being secured to said base structure, said heating elements being laterally disposed therein in parallel relationship; a pair of wire carrying members disposed on opposite ends of said carriage, said supporting structure being disposed in an interference path therebetween; slide means operatively associated with each of said wire carrying members for positioning a bead on each of several wire members at predetermined distances from ends of said wire members, said carriage being adapted thereafter for manual movement for disposition of said wire members and said beads in said heating elements; and timer means, responsive to said manual movement of said carriage, for energizing said heating elements for a predetermined interval, whereby to fuse said beads to said wire members.

7. A device for permanently attaching glass beads to elongated wire members comprising, in combination: a base structure; a carriage; roller means for supporting said carriage for lateral reciprocal movement on said base structure; a plurality of heating elements; a supporting structure for said heating elements, said supporting structure being secured to said base structure, said heating elements being laterally disposed therein in parallel relationship; a pair of wire carrying members disposed on opposite ends of said carriage, said supporting structure being disposed in an interference path therebetween; a plurality of permanent magnets carried by said wire carrying members for retaining said wire members thereon; slide means operatively associated with each of said wire carrying members for positioning a bead on each of several wire members at predetermined distances from ends of said wire members, said carriage being adapted thereafter for manual movement for disposition of said wire members and said beads in said heating elements; and timer means, responsive to said manual movement of said carriage, for energizing said heating elements for a predetermined interval, whereby to fuse said beads to said wire members.

8. A device for permanently attaching glass beads to elongated wire members comprising, in combination: a base structure; a carriage; roller means cooperating with ways in said base structure for supporting said carriage for lateral reciprocal movement on said base structure; stop means for limiting lateral movement of said carriage; a plurality of heating elements; a supporting structure of said heating elements, said supporting structure being secured to said base structure, said heating elements being laterally disposed therein in parallel relationship; a pair of wire carrying members disposed on opposite ends of said carriage, said supporting structure being disposed in an interference path therebetween; stop means for one of the ends of said wire members; slide means operatively associated with each of said wire carrying members for positioning a bead on each of several wire members at predetermined distances from the other of the ends of said wire members, said carriage being adapted thereafter for manual movement for disposition of said wire members and said beads in said heating elements; and timer means, responsive to said manual movement of said carriage, for energizing said heating elements for a predetermined interval, whereby to fuse said beads to said wire members.

9. A device for permanently attaching glass beads to elongated wire members comprising, in combination: a base structure; a carriage; roller means cooperating with ways in said base structure for supporting said carriage for lateral reciprocal movement on said base structure; stop means for limiting lateral movement of said carriage; a plurality of heating elements; a supporting structure for said heating elements, said supporting structure being secured to said base structure, said heating elements being laterally disposed therein in parallel relationship; a pair of wire carrying members disposed on opposite ends of said carriage, said supporting structure being disposed in an interference path therebetween; a plurality of permanent magnets carried by said wire carrying members for retaining said wire members thereon; stop means for one of the ends of said wire members; slide means operatively associated with each of said wire carrying members for positioning a bead on each of several wire members at predetermined distances from the other of the ends of said wire members, said carriage being adapted thereafter for manual movement for disposition of said wire members of said beads in said heating elements; and timer means, responsive to said manual movement of said carriage, for energizing said heating elements for a predetermined interval, whereby to fuse said beads to said wire members.

10. A device for permanently attaching glass beads to elongated wire members comprising, in combination: a base structure; a carriage; roller means for supporting said carriage for lateral reciprocal movement on said base structure; a plurality of heating elements; a supporting structure for said heating elements, said supporting structure being secured to said base structure, said heating elements being laterally disposed therein in parallel relationship; a pair of wire carrying members disposed on opposite ends of said carriage, said supporting structure being disposed in an interference path therebetween; slide means operatively associated with each of said wire carrying members for positioning a bead on each of several wire members at predetermined distances from ends of said wire members, said carriage being adapted thereafter for manual movement for disposition of said wire members and said beads in said heating elements; momentarily energizable timer means, responsive to said manual movement of said carriage in either direction, for energizing said heating elements for a predetermined interval, whereby to fuse said beads to said wire members; and spring means for resetting said timer means.

11. A device for permanently attaching glass beads to elongated wire members comprising, in combination: a base structure; a carriage; roller means cooperating with ways in said base structure for supporting said carriage for lateral reciprocal movement on said base structure; stop means for limiting lateral movement of said carriage; a plurality of heating elements; a supporting structure for said heating elements, said supporting structure being secured to said base structure, said heating elements being laterally disposed therein in parallel relationship; a pair of wire carrying members disposed on opposite ends of said carriage, said supporting structure being disposed in an interference path therebetween; a plurality of permanent magnets carried by said wire carrying members for retaining said wire members thereon; stop means for one of the ends of said wire members; slide means operatively associated with each of said wire carrying members for positioning a bead on each of several wire members at predetermined distances from the other of the ends of said wire members, said carriage being adapted thereafter for manual movement for disposition of said wire members and said beads in said heating elements; momentarily energizable timer means, responsive to said manual movement of said carriage in either direction, for energizing said heating elements for a predetermined interval, whereby to fuse said bead to said wire members; and spring means for resetting said timer means.

References Cited in the file of this patent

UNITED STATES PATENTS

| | | |
|---|---|---|
| 1,681,591 | Millar | Aug. 21, 1928 |
| 2,511,914 | Haas | June 20, 1950 |